United States Patent [19]

Greer

[11] Patent Number: 5,748,505

[45] Date of Patent: May 5, 1998

[54] METHOD AND APPARATUS FOR CALIBRATING A NONCONTACT GAUGING SENSOR WITH RESPECT TO AN EXTERNAL COORDINATE SYSTEM

[75] Inventor: Dale R. Greer, Novi, Mich.

[73] Assignee: Perceptron, Inc., Plymouth, Mich.

[21] Appl. No.: 597,281

[22] Filed: Feb. 6, 1996

[51] Int. Cl.$^6$ .................................................. G01C 3/02
[52] U.S. Cl. ........................... 364/571.02; 364/571.01; 364/571.08; 364/516; 364/525; 356/375; 356/139.03; 356/152.2
[58] Field of Search ................. 364/571.01, 571.02, 364/571.08, 560, 559, 516, 525, 167.01, 424.07, 424.24, 474.34, 474.35; 356/375, 376, 141.1, 139.03, 152.2, 152.3; 33/545–547, 288, 502–506, 791; 395/93, 94, 99, 89, 86; 250/231.1, 231.11, 203.1–203.3, 208.1, 227.2, 559.1, 559.2, 559.29, 559.33, 339.09, 363.09; 901/42, 44, 46, 47; 73/1 R; 382/103, 106, 151, 312, 313, 317, 321

[56] References Cited

U.S. PATENT DOCUMENTS

| | | | |
|---|---|---|---|
| 4,645,348 | 2/1987 | Dewar et al. | 356/376 |
| 4,841,460 | 6/1989 | Dewar et al. | 364/571.02 |
| 4,964,722 | 10/1990 | Schumacher | 356/152.3 |
| 5,090,803 | 2/1992 | Ames et al. | 356/139.03 |
| 5,329,469 | 7/1994 | Watanabe | 364/571.01 |
| 5,388,059 | 2/1995 | De Menthon | 364/559 |
| 5,552,883 | 9/1996 | Busch-Vishniac et al. | 356/139.03 |

Primary Examiner—James P. Trammell
Assistant Examiner—Hal P. Wachsman
Attorney, Agent, or Firm—Harness, Dickey & Pierce, P.L.C.

[57] ABSTRACT

The sensor array is positioned at a vantage point to detect and calibrate its reference frame to the external reference frame demarcated by light-emitting reference indicia. The sensor array encompasses a wide view calibration field and provides data indicating the spatial position of light sources placed within the calibration field. A tetrahedron framework with light-emitting diodes at the vertices serves as a portable reference target that is placed in front of the feature sensor to be calibrated. The sensor array reads and calibrates the position of the light-emitting diodes at the vertices while the structured light of the feature sensor is projected onto the framework of the reference target. The structured light intersects with and reflects from the reference target, providing the feature sensor with positional and orientation data. These data are correlated to map the coordinate system of the feature sensor to the coordinate system of the external reference frame. A computer-generated virtual image display compares desired and actual sensor positions through a real time feedback system allowing the user to properly position the feature sensor without trial and error.

33 Claims, 8 Drawing Sheets

METHOD AND APPARATUS FOR CALIBRATING A NONCONTACT GAUGING SENSOR WITH RESPECT TO AN EXTERNAL COORDINATE SYSTEM

BACKGROUND AND SUMMARY OF THE INVENTION

The present invention relates generally to noncontact gauging systems. More particularly, the invention relates to an apparatus system and method for calibrating noncontact gauging systems.

Demand for higher quality has pressed manufacturers of mass produced articles, such as automotive vehicles, to employ automated manufacturing techniques that were unheard of when assembly line manufacturing was first conceived. Today, robotic equipment is used to assemble, weld, finish, gauge and test manufactured articles with a much higher degree of quality and precision than has been heretofore possible. Computer-aided manufacturing techniques allow designers to graphically conceptualize and design a new product on a computer workstation and the automated manufacturing process ensures that the design is faithfully carried out precisely according to specification. Machine vision is a key part of today's manufacturing environment. Machine vision systems are used with robotics and computer-aided design systems to ensure high quality is achieved at the lowest practical cost.

Achieving high quality manufactured parts requires highly accurate, tightly calibrated machine vision sensors. Not only must a sensor have a suitable resolution to discern a manufactured feature of interest, the sensor must be accurately calibrated to a known frame of reference so that the feature of interest may be related to other features on the workpiece. Without accurate calibration, even the most sensitive, high resolution sensor will fail to produce high quality results.

In a typical manufacturing environment, there may be a plurality of different noncontact sensors, such as optical sensors, positioned at various predetermined locations within the workpiece manufacturing, gauging or testing station. The workpiece is placed at a predetermined, fixed location within the station, allowing various predetermined features of the workpiece to be examined by the sensors. Preferably, all of the sensors properly positioned and should be carefully calibrated with respect to some common fixed frame of reference, such as a common reference frame on the workpiece or at the workstation.

Keeping sensors properly positioned and calibrated is more easily said than done. In a typical manufacturing environment sensors and their associated mounting structures may get bumped or jarred, throwing the sensor out of alignment. Also, from time to time, a sensor needs to be replaced, almost certainly requiring reorienting and recalibrating. Quite simply, sensor positioning, alignment and calibration is a fact of life in the typical manufacturing plant.

The problem with sensor positioning, alignement and calibration is the time required. Invariably, the entire manufacturing assembly line for a given part must be shut down and the workstation cleared, so that the sensor may be positioned, aligned and recalibrated. In some instances this entails placing a highly accurate (and very expensive) full-scale model of the workpiece in the workstation. This highly accurate master part is sometimes called a "golden part" or "body in white." The master part is placed in careful registration with the external coordinate system of the workstation and then each sensor is trained on its assigned feature (such as a hole or edge). Once positioned, the sensors are locked into place and calibrated and the master part is removed. Only then can the assembly line be brought back online.

As an alternative to using a master part, it is possible to calibrate the gauging sensor by attaching a target to the sensor and illuminating the target using a plane of structured light produced by the sensor. A pair of optical sighting devices, theodolites, are placed at different vantage points within the workspace. The theodolites triangulate on the illuminated target to provide an independent reading of the position of the target. The theodolites are placed at carefully prescribed locations relative to the external reference frame. With the gauging sensor projecting structured light onto the target, the theodolites are manually aimed at the lighted targets and readings are taken. The respective readings of the theodolites and the gauging sensor are coordinated and translated to calibrate the sensor relative to the external reference frame. It is a trial and error process. If the sensor needs to be reoriented (as is often the case), the theodolites must be manually retrained on the target after each sensor position adjustment. For more information on this calibration technique, see U.S. Pat. No. 4,841,460 to Dewar et al.

Whereas both of the aforementioned calibration techniques do work, there is considerable interest in a calibration technique that is quicker and easier to accomplish and that eliminates the need to rely on expensive master parts or expensive theodolite equipment. To this end, the present invention provides a calibration system that can be used in a matter of minutes, instead of hours, and without the need for precisely manufactured master parts or theodolite equipment. One of the major advantages of the invention is that it allows the calibration of a sensors to be checked or realigned between line shifts, without requiring the line to be shut down for an extended period.

The calibration system employs reference indicia that are disposed in fixed relation to the external reference frame of the manufacturing or assembly zone or gauging station. These reference indicia may be simple light-emitting diodes that are disposed at predetermined fixed locations. A calibration sensor array is positioned at a vantage point, typically above the gauging station, so that the reference indicia are within the sensor array's field of view. If desired, the calibration sensor array can be permanently or semipermanently mounted at a suitable vantage point within the workpiece manufacturing or assembly station. This is not a requirement, however, as the sensor array is comparatively lightweight and can be quickly placed in position when it is time to calibrate one or more of the feature sensors.

The calibration system further employs a portable reference target that is placed within the observation field of the sensor array and also within the sensing zone of the feature sensor to be calibrated.

The presently preferred portable reference target is a tetrahedron framework having light-emitting diodes at the vertices. The tetrahedron framework provides at least three noncolinear and noncoplanar geometric structures (e.g., straight edges) that are illuminated by structured light emanating from the feature sensor. These noncolinear geometric features provide the feature sensor with unambiguous spatial data for measuring the spatial position and attitude of the target. The light-emitting diodes at the vertices of the target comprise at least three point sources of light that may be switched on and off, or otherwise controlled, to provide unambiguous spatial positioning data to the sensor array. The light-emitting diodes comprising the presently preferred reference indicia within the fixed reference frame may be switched on and off or similarly controlled.

The system further includes a coordinate translation system for coordinating the readings from the sensor array and from the feature sensor. More specifically, the translation system is adapted for coupling to the sensor array to the feature sensor to collect data from various light-emitting and light-reflecting structures read by these sensors. The translation system establishes a first relationship between the reference frame of the sensor array and the external reference frame with which the reference indicia are associated. The translation system also collects data from the portable reference target as viewed by both sensor array and feature sensor and establishes a second relationship between the array reference frame and the feature sensor reference frame. Finally, the translation system determines a third relationship between the external reference frame and the feature reference frame, whereby the feature sensor is calibrated with respect to the external reference frame.

Using the calibration system of the invention, it is easy to calibrate a feature sensor. The reference indicia are first illuminated in a pattern that is observed by the sensor array and used by the coordinate translation system to calibrate the sensor array to the external reference frame. Next the target is placed within the field of view of the sensor array and the feature sensor under calibration. The portable reference target is calibrated with respect to the reference frame of the sensor array, by using the sensor array to observe the pattern of point light sources situated at the vertices of the portable reference target. The feature sensor is then calibrated by projecting structured light from the feature sensor onto the portable reference target. The structured light intersects the target, producing reflected light patterns at the edges of the target that are then read by the feature sensor. The coordinate translation system then performs the appropriate coordinate translation to map the reading of the feature sensor back to the external reference frame.

The entire calibration sequence can be performed quite quickly. The sensor array and portable reference targets are both lightweight and easily positioned. Moreover, the entire calibration sequence may be performed rapidly under computer control. In most instances, all the calibration technician must do is point the feature sensor in the right direction and at the right orientation, place the portable reference target in front of the feature sensor and then allow the system to do the rest.

To make it easy for the technician to position the feature sensor in approximately the correct direction, the present invention provides a unique "virtual image" positioning aid. The calibration system is preprogrammed with information describing the correct feature sensor mounting angle and position. Mounting the portable reference target to the feature sensor allows the calibration sensor array to track the position of the feature sensor as the calibration technician moves it into the correct position.

The calibration system provides the technician with a computer-generated virtual image of the correct sensor position as well as the actual sensor position. By watching the virtual image on the computer screen, the technician manipulates the feature sensor until the virtual images coincide. Adjusting the physical position of the feature sensor to produce coincident virtual images on the computer screen ensures that the feature sensor is properly pointed in the correct direction and oriented properly. Once pointed in this direction, the coordinate translation system performs the precise sensor calibration, determining the proper coordinate vector manipulation needed to map the feature sensor reference frame to the external reference frame.

The presently preferred implementation uses a virtual image display that is not bilaterally symmetrical (such as the letter "P" or the letter "F") so that the user is presented with an unambiguous symbol with which to position the feature sensor. Advantageously, the positioning system provides real time visual feedback to the calibration technician, making sensor positioning a simple matter.

For a more complete understanding of the invention, its objects and advantages, reference may be had to the following specification and to the accompanying drawings.

DESCRIPTION OF THE PREFERRED EMBODIMENT

Figure 1:
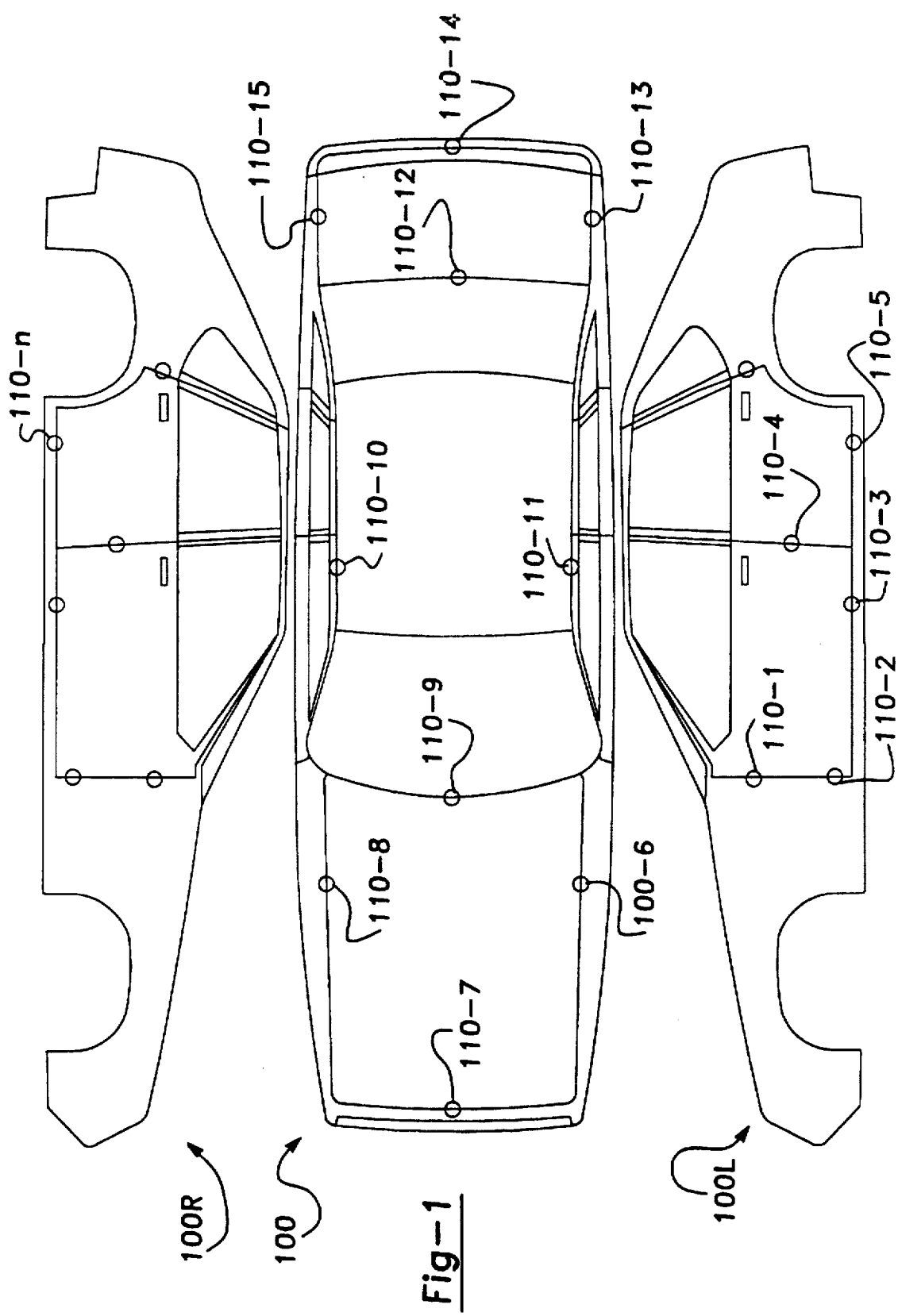
FIG. 1 is a simultaneous top and side view of a portion of an automotive vehicle body, showing typical points of interest which would be placed in the field of view of a plurality of noncontact feature sensors at a gauging station.

With reference to FIG. 1, there is shown a typical automotive vehicle body portion which, prior to its assembly with other of the vehicle components, would require gauging of certain key points. Such miscellaneous points of interest on workpiece 100 of FIG. 1 are shown as points 110-1 through 110-n. The left side 100L of the vehicle body and the right side 100R of the vehicle body are shown in an "unfolded" view for convenience in FIG. 1. Typical usages of the points or the manner in which they are selected would be dictated, for example, by the ensuing assembly process to take place with respect to the workpiece 100. For example, assume that the hood has not yet been assembled over the hood cavity at the front of the vehicle. Then measurements about the periphery of the hood cavity, such as at points 110-6, 110-7, 110-8 and 110-9 could be made to determine whether the ensuing assembly of the hood lid to the vehicle body can be performed with an acceptable fit between the parts to be assembled.

While there are many sensor arrangements known, including the optical arrangement disclosed in U.S. Pat. No.

4,645,348 to Dewar et al., assigned to the assignee of the present invention, it has been extremely difficult to calibrate the sensor readings at all the desired points of interest about a large workpiece with respect to any desired external reference frame.

Figure 2:
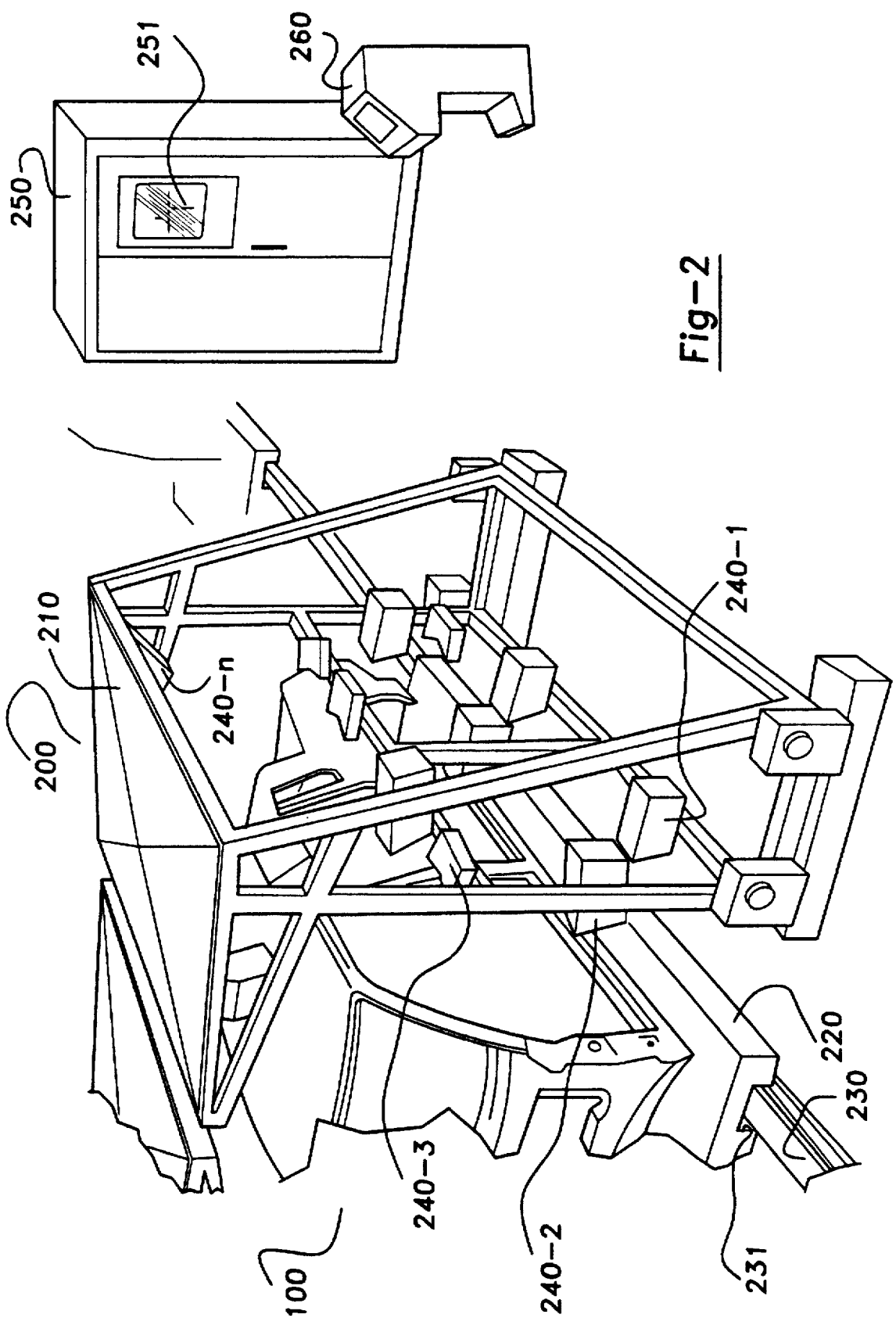
FIG. 2 is a perspective view of a typical gauging station on an automotive assembly line, including a plurality of noncontact feature sensors to be calibrated in accordance with the principles of the invention.

A typical gauging station for an automotive vehicle part as shown in FIG. 1 could take the form shown in FIG. 2. Workpieces to be gauged at gauging station 200 rest on transporting pallets 220, which are moved along an assembly line via pallet guides 230 that pass through guide channels 231 in the pallet. At the gauging station 200, a sensor mounting frame 210 (only one half of which is shown in perspective in FIG. 2) surrounds the workpiece 100 to be gauged and provides a plurality of mounting positions for a series of optical gauging sensors or feature sensors 240-1 through 240-n, each designed in accordance with the disclosure of U.S. Pat. No. 4,645,348, for example. Communication cables which are not specifically shown in FIG. 2 for clarity, couple the sensors 240 to a machine vision computer 250 which includes a CRT or cathode ray tube display 251. Optionally provided with a typical machine vision computer is a printer 260. The apparatus and method of this invention may be used to effect calibration of each of the sensors 240 with respect to a predetermined external coordinate system or reference frame, associated, for example, with the workpiece 100 to be measured or with respect to an external reference frame associated with the gauging station itself.

Figure 3:
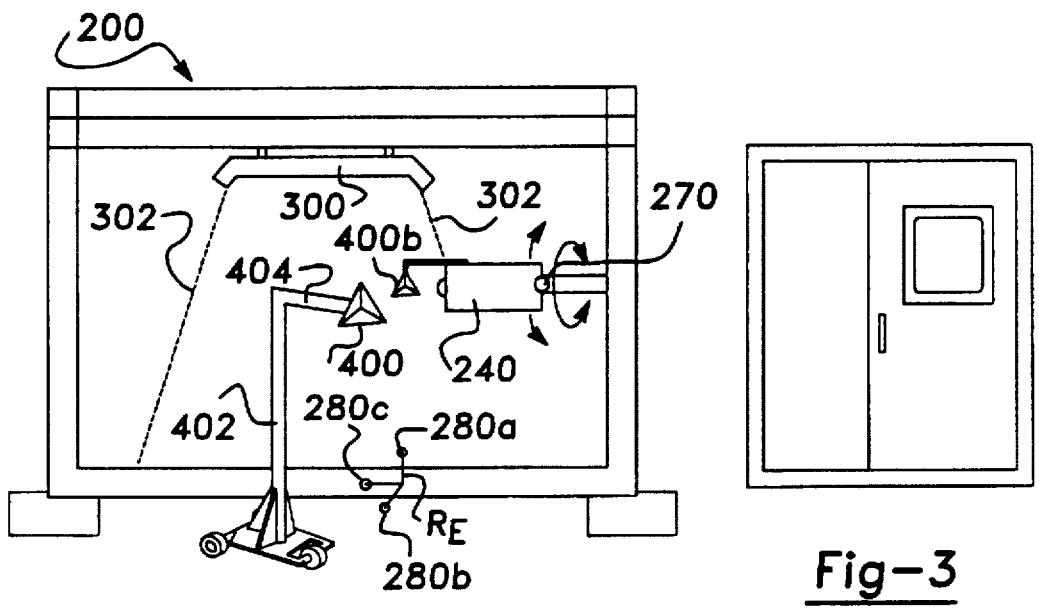
FIG. 3 is a side elevational view of the calibration system of the invention.

Referring to FIG. 3, gauging station 200 is shown in conjunction with the calibration system of the invention. To simplify the illustration, only one feature sensor 240 has been illustrated. The feature sensor 240 is adjustably secured to the gauging station frame as at 270, allowing the feature sensor to be positionally adjusted and then tightened or locked into place once it is properly aimed at the point in space (x, y, z) where the workpiece feature of interest will be located and is properly oriented at the correct attitude (pitch, yaw and roll).

The calibration system includes a calibration sensor array 300 that may be positioned at a convenient vantage point, such as above the space that is occupied by the workpiece in the gauging station. The sensor array may be permanently attached to the gauging station, if desired. Alternatively, the sensor array can be temporarily positioned in a fixed location, such as by hanging it from the gauging station frame or mounting it on a movable stand, allowing the sensor array to be moved from location to location throughout the manufacturing facility.

The calibration system further includes a portable reference target 400. The presently preferred reference target is a lightweight, readily transportable tetrahedron framework. The reference target 400 can be mounted on any suitable fixture, allowing it to be positioned in front of the feature sensor 240 for the calibration operation. In FIG. 3 a first reference target 400a is shown attached to a simple tripod stand 402 with cantilevered arm 404. A second reference target 400b is attached by bracket directly to the feature sensor 240. These are just two examples, as other supporting structures may be used.

To illustrate the principles of the invention, it will be assumed that the feature sensor 240 is to be calibrated with respect to an external frame of reference associated with the stationary gauging station 200. In this regard, external reference frame $R_E$ has been diagrammatically included in FIG. 3. A plurality of noncolinear reference indicia 280a, 280b and 280c are incorporated into the structure of the gauging station 200. These reference indicia are used by the sensor array 300 in calibrating the sensor array to the fixed reference frame $R_E$. In the presently preferred embodiment indicia 280a–280c are light-emitting diodes that can be individually turned on and off during part of the calibration sequence. In the presently preferred embodiment each of the light-emitting diodes 280a–280c are illuminated, one at a time, while the sensor array detects and records its position. The three reference indicia are geometrically arranged in a noncolinear pattern that the sensor array uses to determine its three-dimensional position relative to the reference frame $R_E$.

Although simple switched LED devices are easy to implement and are therefore presently preferred, other reference indicia may be used. For example, the reference indicia may be different colors, or modulated at different flashing rates to allow the sensor array to distinguish each reference indicia from the others.

Sensor array 300 is designed to provide a wide field view over a predetermined calibration field. In FIG. 3 the calibration field of sensor array 300 is delimited by dotted lines 302. Sensor array 300 employs light-sensitive charge coupled devices (CCD) that allow the sensor array to determine the three-dimensional position of a source of light within its calibration field 302. As will be more fully described below, the portable reference target 400 is provided with light-emitting diodes (not shown in FIG. 3) at the vertices of the tetrahedron framework. These light-emitting diodes, when illuminated, are visible to sensor array 300 whenever the portable reference target 400 is positioned anywhere within calibration field 302. Thus the sensor array 300 is able to calibrate itself with respect to the reference indicia 280a–280c, and also to calibrate the position of the portable reference target with respect to the reference frame of the sensor array.

Figure 4:
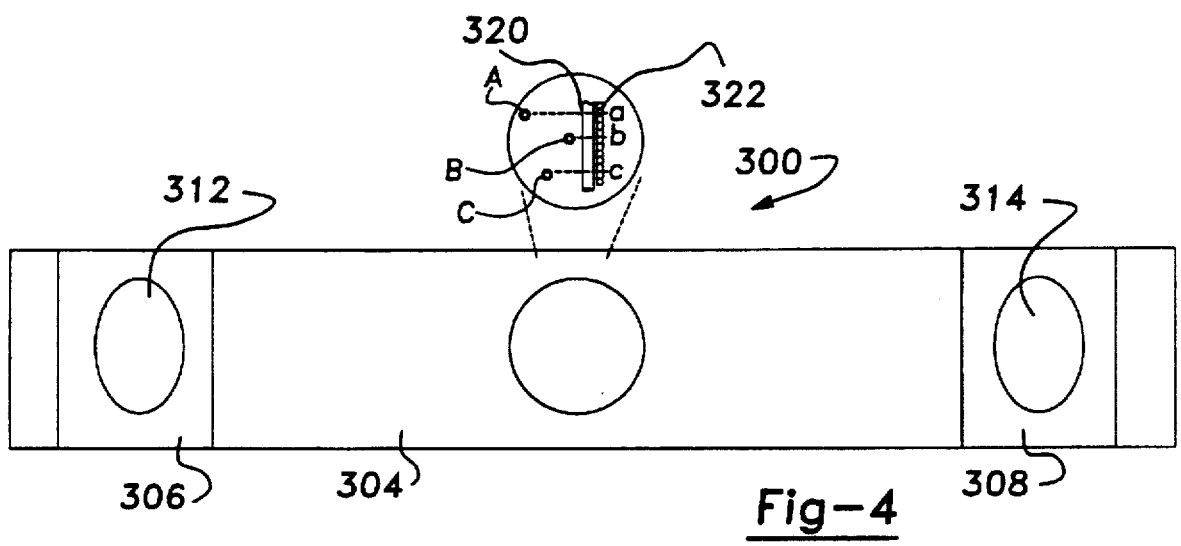
FIG. 4 is a front elevational view of the calibration sensor array of the preferred embodiment.
Figure 5:
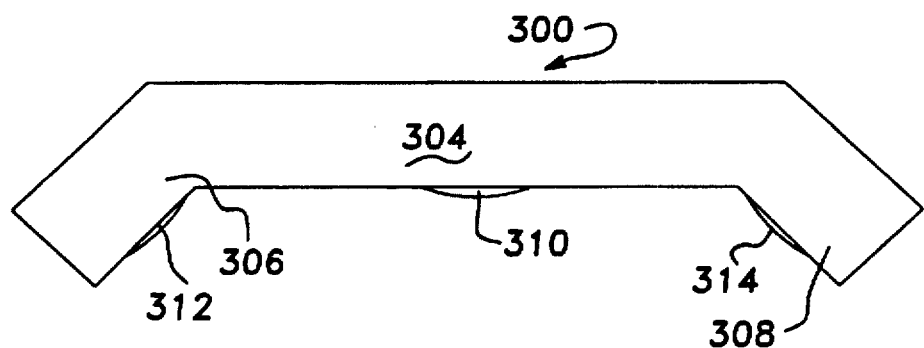
FIG. 5 is a top elevational view of the sensor array of FIG. 4.

FIG. 4 and FIG. 5 show the sensor array 300 in greater detail. Sensor array 300 comprises an elongated housing 304 that includes inwardly bent left and right wings 306 and 308. Located at the center of the housing is a horizontally arranged linear sensor 310. Located in the left and right wings are vertically arranged linear sensors 312 and 314. Although the linear sensors 310, 312 and 314 are positioned at different orientations and have different optical vantage points, they are constructed essentially the same.

Each linear sensor comprises a linearly oriented charge coupled device positioned behind a cylindrical lens or other suitable light-focusing structure. In its simplest form, the cylindrical lens can be a cylindrical glass rod that is placed in front of the charge coupled device. The charge coupled device can be a 1×n device, where n is selected to provide suitable resolution (e.g. 4096 bits).

As shown in the inset to FIG. 4, the cylindrical lens 320 and linear CCD array 322 are configured so that one spatial dimension is resolved with the other dimensions being ignored. In the inset, a light source at position A will illuminate element a of the linear CCD 322. A light source at B will illuminate element b and a light at C will illuminate element c. The fact that light sources A, B and C are at different distances from lens 320 makes essentially no difference. Thus the linear sensor resolves only the light's position along the longitudinal axis of the lens.

Because the linear sensors 310, 312 and 314 are positioned at different orientations and have different viewing angles, the three sensors collectively are able to determine the spatial position of a point source of light in three-dimensional space. For a light source at any three-dimensional position within the calibration field 302 of the sensor array, the sensor array provides output data from which the XYZ position of the light source may be derived. Sensor array 300 thus provides XYZ position data relative to the reference frame of the sensor array itself. Suitable sensor array technology is available from Northern Digital or Pixsys, Inc., Boulder, Colo.

Figure 6:
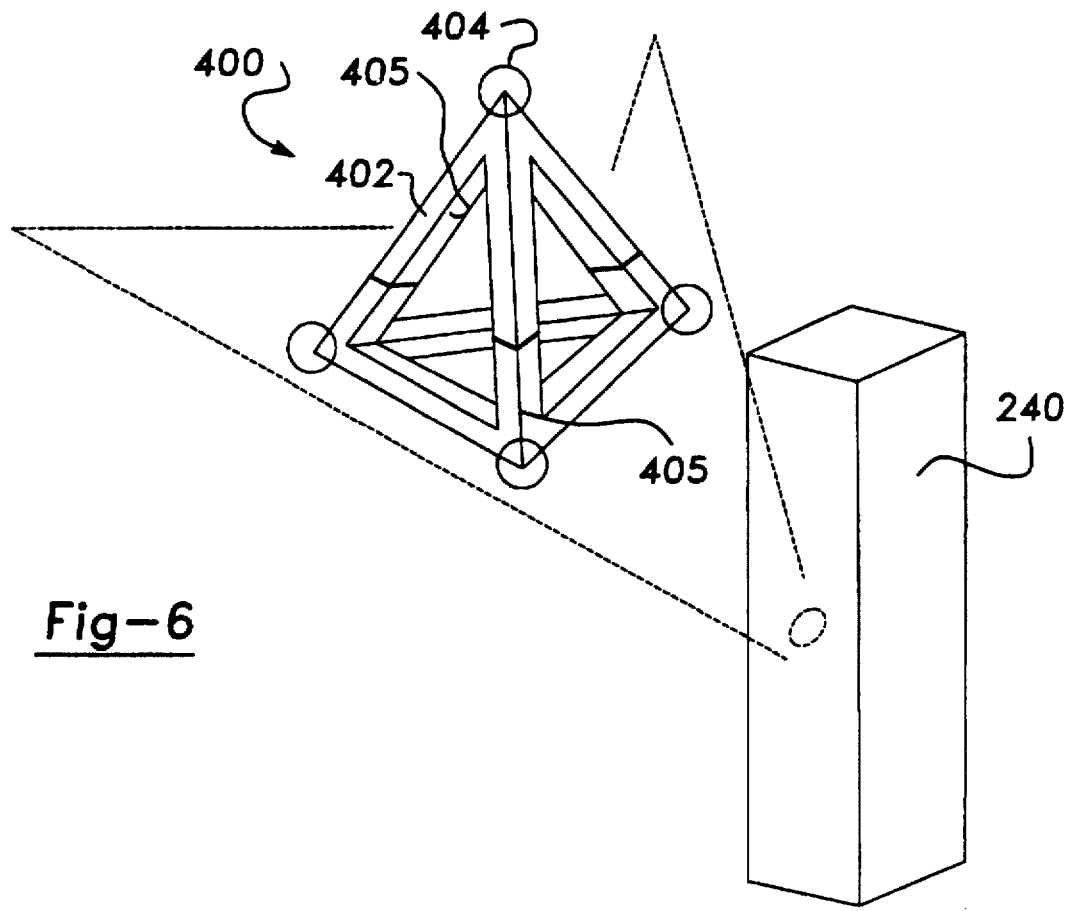
FIG. 6 is a perspective view of the presently preferred portable reference target.

Referring to FIG. 6, the portable reference target 400 comprises a framework of individual struts 402 with light-emitting diodes 404 at the vertices. The light-emitting diodes are preferably separately controllable to allow them to be selectively and individually illuminated by the calibration system. The struts 402 each define a straight edge 405 along each inner and outer facing edges. When the reference target is illuminated with structured light (i.e., light emanating in a planar pattern) the struts and straight edges facing the structured light source are illuminated as illustrated in FIG. 6. The feature sensor of the preferred embodiment emits a planar structured light pattern during operation. By placing the portable reference target in front of the feature sensor, a characteristic reflected light pattern is achieved, as illustrated. Because the straight edges 405 are noncolinear and noncoplanar, the location and orientation (XYZ position and pitch, yaw, roll) of the portable reference target may be precisely ascertained.

Figure 7A:
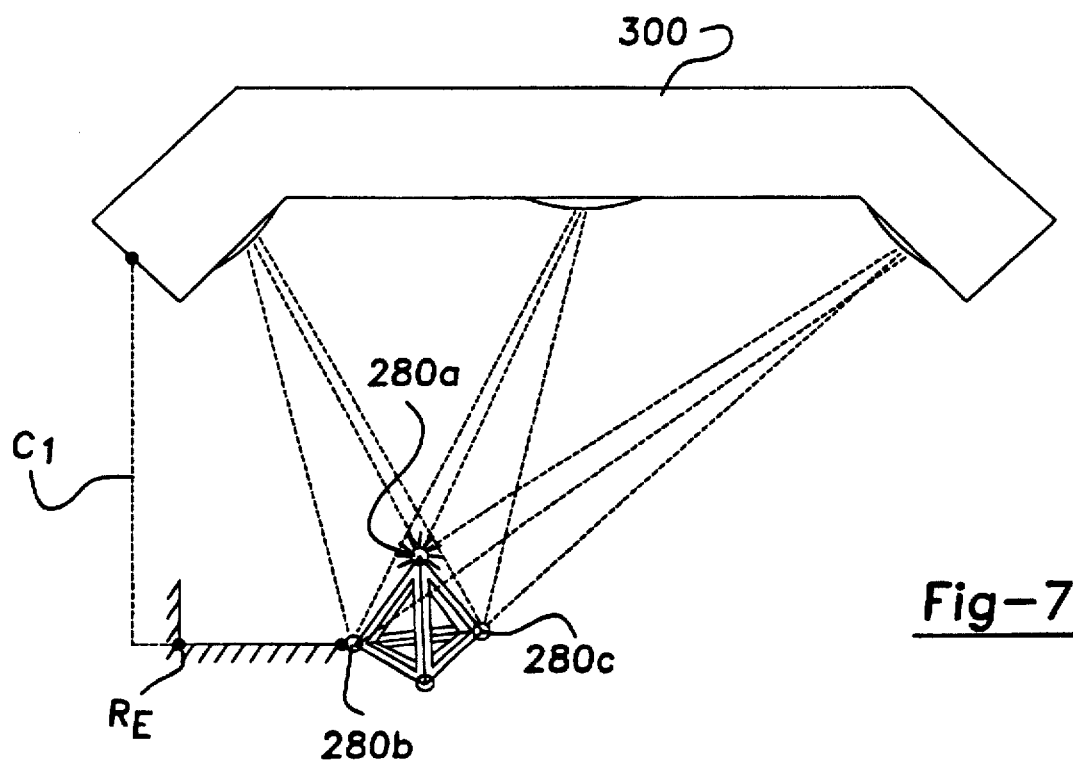
FIGS. 7a, 7b and 7c are diagrammatic representations of the calibration system, useful in understanding the calibration method of invention.
Figure 7B:
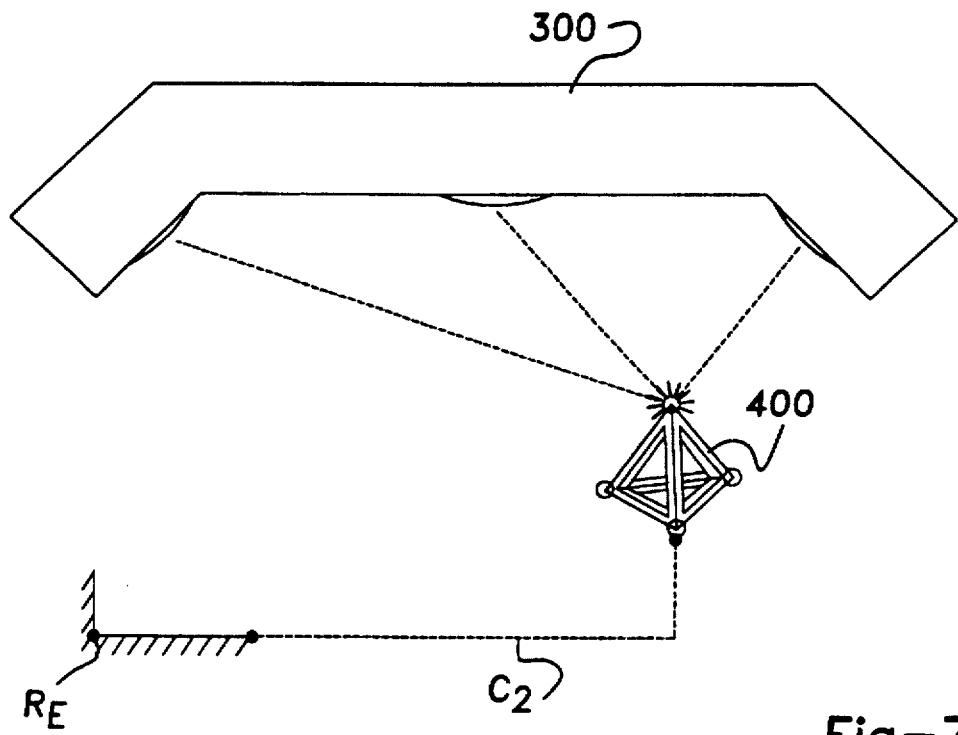
Figure 7C:
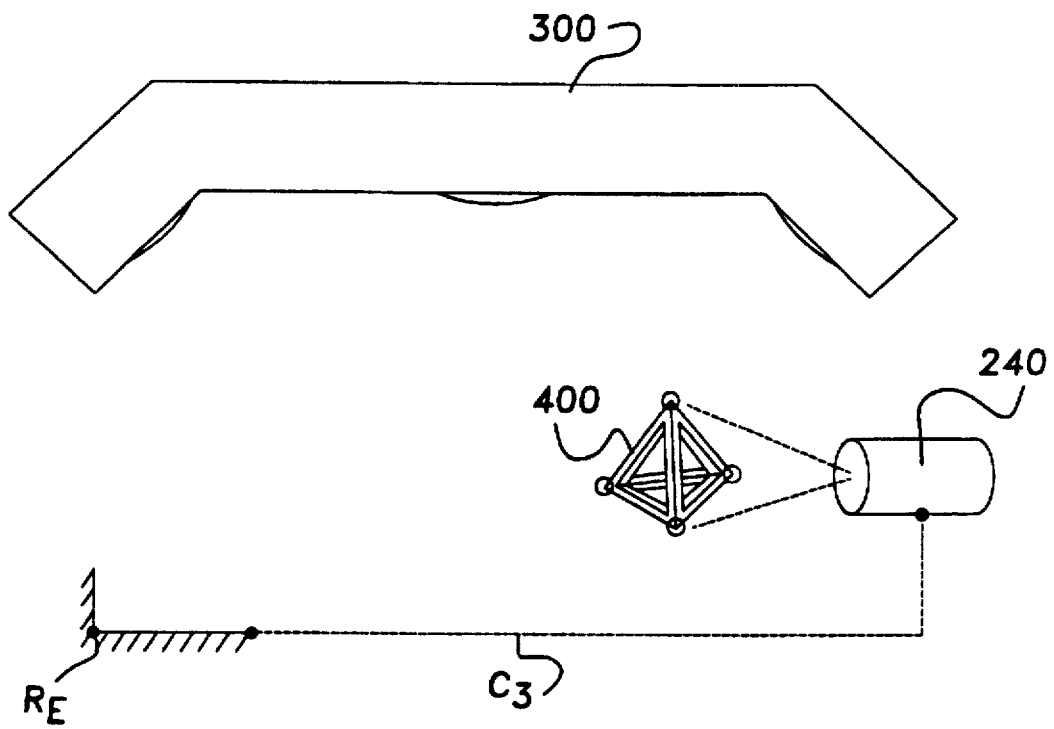

Referring to FIGS. 7a-7c, the calibration technique will now be described. Referring to FIG. 7a, the sensor array 300 is first calibrated with respect to the fixed reference frame $R_E$. This is done by sequentially illuminating light-emitting diodes 280a-280c while the sensor array collects data on the position of each. These data are then used to calibrate the sensor array with respect to the external reference frame $R_E$. This is illustrated diagrammatically by the dashed line $C_1$.

Referring next to FIG. 7b, the portable reference target is placed within the calibration field of the sensor array and the light-emitting diodes at the vertices of the reference target 400 are sequentially illuminated while data are collected by the sensor array. These data are then used to calibrate the position of the portable reference target with respect to the fixed reference frame $R_E$. This is illustrated diagrammatically by dashed line $C_2$.

Finally, the feature sensor 240 projects structured light onto the portable reference target 400 and the feature sensor collects reflected light data from the portable reference target. Specifically, the position of the straight edges of the target are ascertained and these are used to describe the spatial position of the reference target in the reference frame of the feature sensor. Once these data are collected the feature sensor is then calibrated to the fixed reference frame $R_E$, as diagrammatically illustrated by dashed line $C_3$.

In the foregoing example, the sensor array was calibrated first, the position of the portable reference target was calibrated second and the feature sensor was calibrated third. Of course, these operations could be performed in a different sequence to achieve the same end result.

Figure 8:
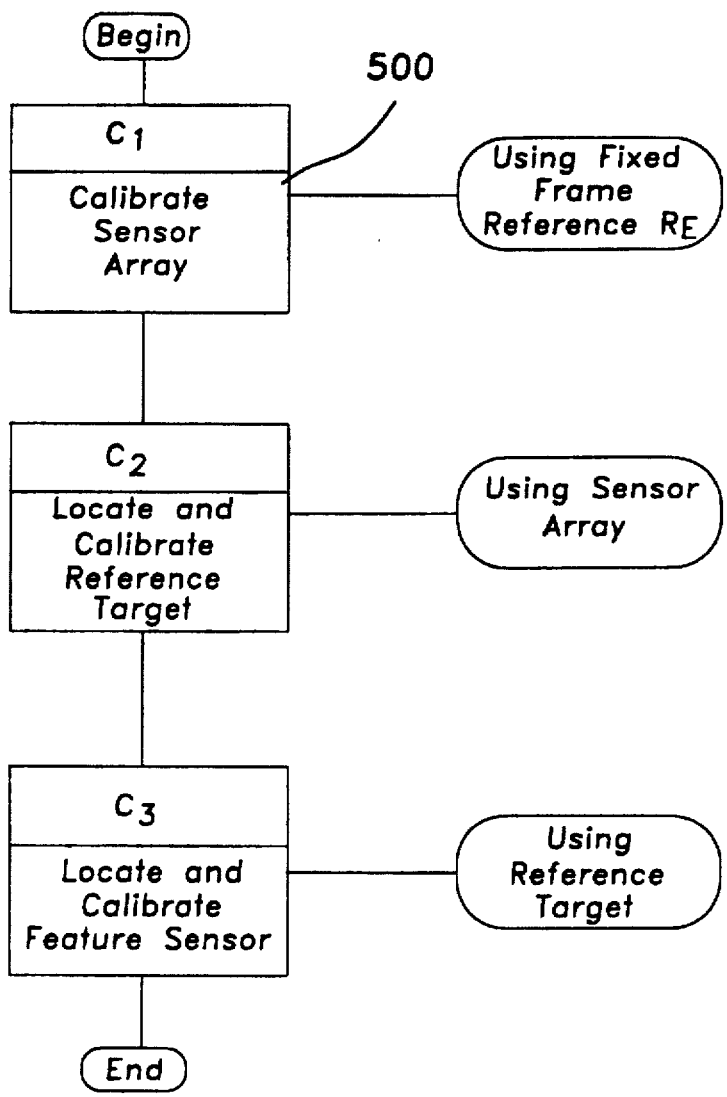
FIG. 8 is a flowchart diagram further illustrating the calibration method.
Figure 10A:
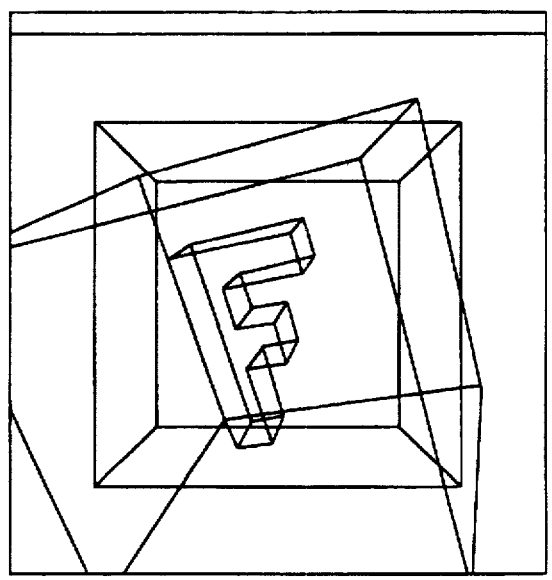
FIGS. 10a, 10b, 10c and 10d show a series of virtual image display screens, showing the sensor aiming system in use.

Referring to FIG. 8, the presently preferred calibration sequence shown in the series of FIGS. 7a-7c is described in the flowchart. Beginning at step $C_1$ the sensor array is calibrated using the fixed reference frame $R_E$. Next, in step $C_2$ the portable reference target is located and calibrated using the sensor array. Finally, in step $C_3$ the feature sensor is located and calibrated using the reference target.

One of the big advantages of the present system over prior calibration systems is that calibration can be effected much more quickly and without the need to rely on an expensive golden part. One reason for this is the wide field of view of the sensor array and its ability to quickly locate the spatial position of a light source without moving parts. Thus the entire calibration sequence can be performed under computer control. In contrast with techniques employing theodolite devices for calibration, the sensor array does not need to be physically trained and retrained on the reference target each time the feature sensor is repositioned. Rather, the sensor array is able to report the spatial position of the reference target regardless of where it is moved within the calibration field.

The description heretofore has concentrated on the calibration procedure whereby the output of the feature sensor is mapped to or correlated to the fixed reference frame $R_E$. In practice, there is often more to sensor realignment and calibration other than mapping the feature sensor to the coordinate system of the reference frame. When a feature sensor is replaced, or when it must be repositioned after being bumped or jarred, conventional practice has required that a workpiece be placed in the work gauging station, so that the feature sensor may be trained on approximately the correct orientation. Once generally oriented, the more precise calibration can be undertaken.

The conventional practice of using an actual workpiece to roughly position each feature sensor is very time-consuming. The present invention provides a better way. The present invention generates a virtual image of the desired feature sensor position and a simultaneous virtual image of the actual feature sensor position. The two virtual images are displayed on the display screen of the machine vision computer, allowing the operator to determine at a glance whether the desired sensor position has been achieved. These virtual displays are updated in real time so the operator can physically adjust the position of the feature sensor while watching the virtual image of its actual position move relative to the virtual image of the desired position. The operator simply manipulates the sensor while watching the virtual images until they coincide. Once the images coincide the feature sensor is properly positioned and may be tightened in place.

Figure 9:
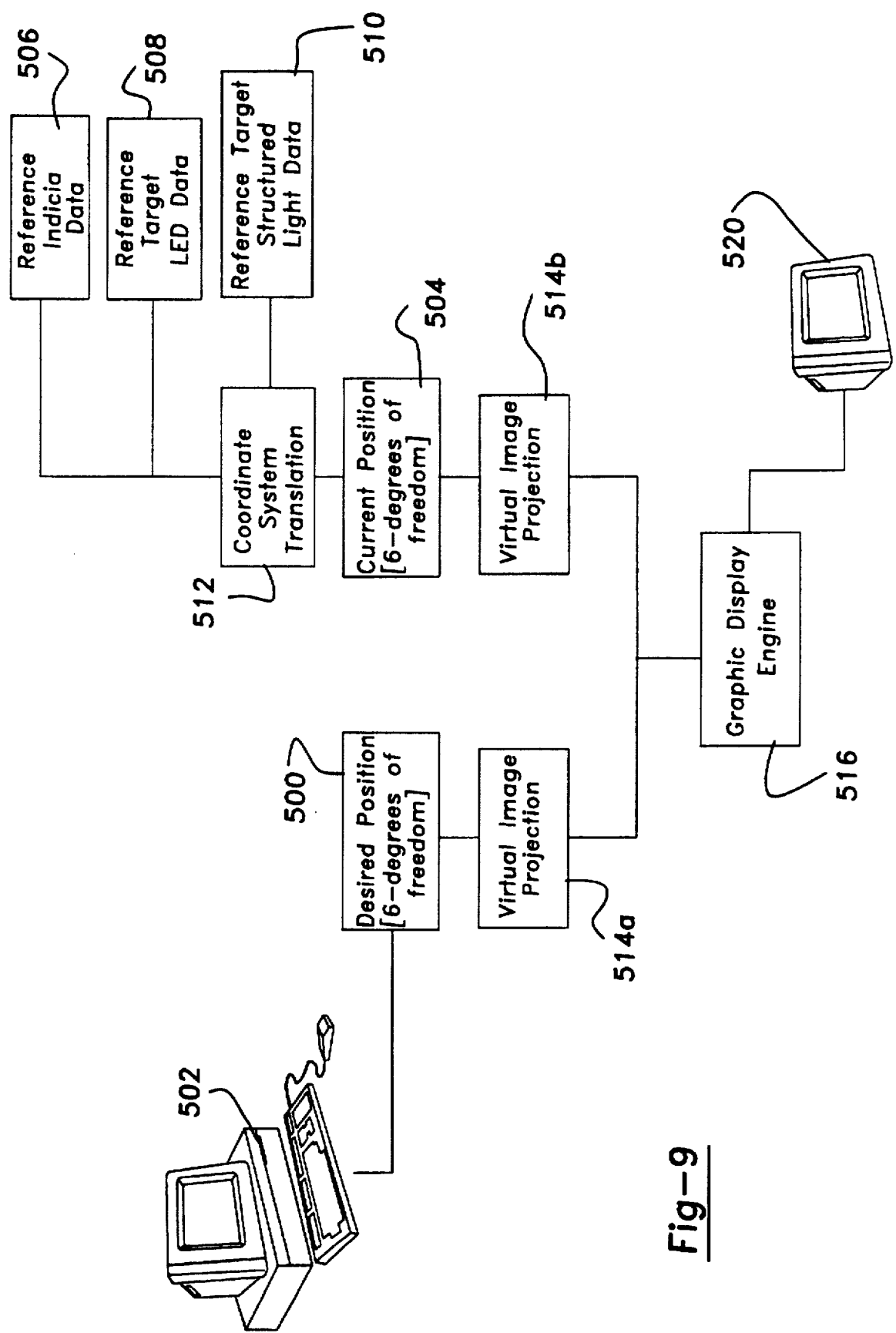
FIG. 9 is a software block diagram illustrating the virtual image generation system used in aiming the feature sensor prior to calibration.
Figure 10B:
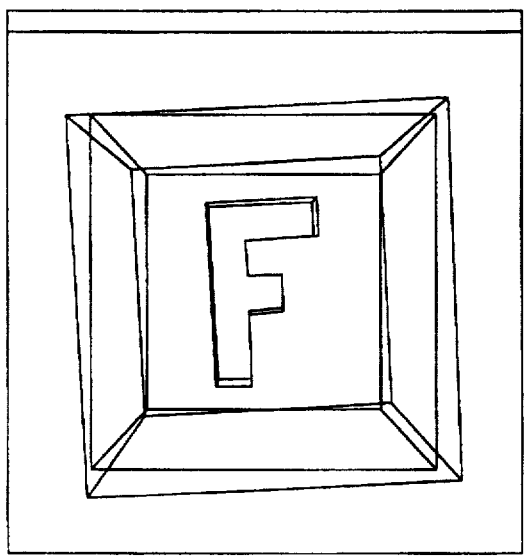
Figure 10C:
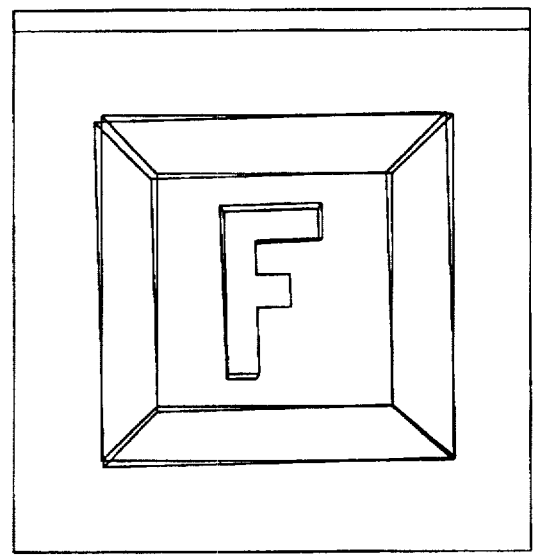
Figure 10D:
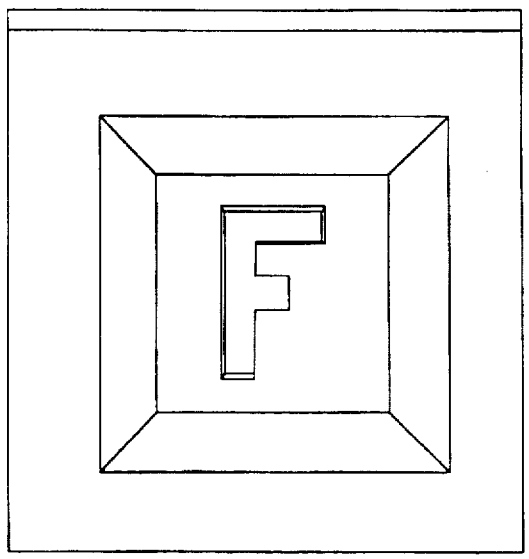

Referring to FIG. 9, the system for providing this virtual image sensor positioning feature is illustrated. FIG. 9 is a software block diagram showing the components that may be used to generate the virtual image. The desired position of the feature sensor is stored in data structure 500 as a vector representing the six degrees of freedom (x, y, z, pitch, yaw and roll) needed to specify the position and orientation of the feature sensor. The desired position data can be predetermined by calibration using an existing workpiece, such as a master part. However, in many applications it may be more expedient to supply the sensor position data directly from the computer-aided design workstation that is used to generate the manufactured workpiece specifications. In this regard, CAD workstation 502 is illustrated in FIG. 9.

Meanwhile, the software system must also ascertain the current position of the feature sensor and this information is stored in data structure 504, also as a vector representing the six degrees of freedom. The current position of the feature sensor is generated using data that is captured in real time from the calibration sensor array and the feature sensor being positioned. Specifically, the sensor array is used to detect the reference indicia that are related to the external reference frame. These data are stored in data structure 506.

The portable reference target is placed in front of the feature sensor; it may be physically attached to the front of the sensor by means of a convenient bracket, if desired. As will be seen, the precise positioning of the reference target in front of the feature sensor is not critical. The light-emitting diodes at the vertices of the reference target are sequentially illuminated and read by the sensor array. These data are captured as reference target LED data and stored in data structure 508.

Finally, the feature sensor is used to project structured light onto the reference target and the reflected pattern returned from that target is read by the feature sensor as structured light data. These data are stored in data structure 510.

As will be appreciated from the previous discussion, the data stored in structures 506, 508 and 510 describe a relationship between the fixed reference frame and the current position of the feature sensor. The coordinate system translation module 512 receives these data and computes the current position of the feature sensor, which is then stored in data structure 504. In essence, the current position of the feature sensor, i.e., the direction it is pointing and its orientation, is precisely determined through the relationship by which the reference frame may be mapped onto the reference frame of the feature sensor. Importantly, the data collected and stored in data structures 506, 508 and 510 are collected rapidly enough to provide real time position feedback to the operator. The presently preferred system gathers data from the LED indicia and from the reference target at a rate of about 5 to 10 samples per second, although faster and slower data gathering times can be used.

The six degrees of freedom representing the desired position (stored in structure 500) and the six degrees of freedom representing the current sensor position (stored in structure 504) are then each fed to a virtual image projection mapping module that generates a two-dimensional virtual image to represent the three-dimensional, six degree of freedom data. In FIG. 9 the virtual image projection modules are separately illustrated at 514a and 514b. These modules have been illustrated separately as one possible way of configuring the system. It is also possible to use a single virtual image projection module that receives data from both desired position and current position data structures to generate both virtual images. In essence, the virtual image is computer graphic data representing a convenient virtual image shape that is not bilaterally symmetrical and thus can be used to unambiguously represent all six degrees of freedom. The presently preferred embodiment uses simple nonbilaterally symmetrical graphic elements such as the capital letter P or the capital letter F (see FIGS. 10a–10d. Of course, other similar symbols could be used.

The virtual images generated by projection modules 514a and 514b are fed to graphic display engine 516 which is actually responsible for producing the appearance of the virtual image symbol (the letter P or the letter F, for example) at its specified position and angle of orientation (pitch, yaw and roll). The graphic display engine interfaces with the graphics hardware and associated operating system software of a suitable graphic display monitor 520. In many applications this display monitor would be the CRT display 251 of the machine vision computer illustrated in FIG. 2. Of course the invention is not limited to any particular hardware platform. In heavy manufacturing applications, a case-hardened, machine vision computer system is often the best choice. In less rugged applications, the personal computer or workstation could be used to implement the system of the invention.

Moreover, while the tetrahedron-shaped reference target is presently preferred, the principles of the invention may be readily extended to other reference target configurations. In this regard, whereas the Applicants' preferred system uses structured light (light projected from the feature sensor in a plane), certain aspects of the invention, including the virtual image sensor positioning capability, are not necessarily restricted to systems employing structured light. For example, instead of using optics, the calibration could use sonic sensing technology. The LEDs on the target would be replaced with sound generators (spark generators) and the arrival time of the sonic pulses would indicate position and orientation of the target in a manner similar to the LEDs of the preferred embodiment.

From the foregoing it will be appreciated that the present invention provides a significant advance in the gauging system art. The invention calibrates the reference sensor to an external reference frame without the need for expensive golden parts and without the need for labor-intensive calibration using sighting devices such as the theodolite. Moreover, the calibration system of the invention gives the user direct real time feedback through the virtual image system, allowing a calibration technician to easily train the feature sensor to the correct position and orientation without time-consuming trial and error.

While the invention has been described in its presently preferred form, it will be understood that the invention is capable of modification without departing from the spirit of the invention as set forth in the appended claims.

What is claimed is:

1. A sensor calibration system for calibrating a feature sensor with respect to an external reference frame, the feature sensor of the type having a sensing zone associated with a sensor reference frame comprising:

reference indicia disposed in fixed relation to said external reference frame;

a calibration sensor array having a calibration field of observation associated with an array reference frame, said calibration sensor array being positionable at vantage point such that said reference indicia is within the calibration field;

a reference target for placement within the observation field of said calibration sensor array and within the sensing zone of said feature sensor;

a coordinate translation system being adapted for coupling to said sensor array for collecting data from said reference indicia and for establishing a first relationship between the array reference frame and the external reference frame;

said coordinate translation system further being adapted for coupling to said sensor array and to said feature sensor for collecting data from the reference target and for establishing a second relationship between the array reference frame and the sensor reference frame; and said coordinate translation system determining a third relationship between the external reference frame and the sensor reference frame, whereby the feature sensor is calibrated with respect to the external reference frame.

2. The system of claim 1 wherein said reference indicia comprises at least one light emitter and wherein said calibration sensor array is an optical sensor.

3. The system of claim 1 wherein said reference indicia comprises at least one point source of light.

4. The system of claim 1 wherein said reference indicia comprises at least three noncolinear sources of light.

5. The system of claim 1 wherein said reference target includes at least one light emitter.

6. The system of claim 1 wherein said reference target includes at least one point source of light.

7. The system of claim 1 wherein said reference target includes at least three noncolinear sources of light.

8. The system of claim 1 wherein said feature sensor is an optical sensor.

9. The system of claim 1 wherein said feature sensor is an active optical sensor that emits structured light and senses reflected light.

10. The system of claim 1 wherein said calibration sensor array comprises a plurality of focused optical sensors directed along separate, converging axes within said field of observation.

11. The system of claim 1 wherein said reference target comprises a three-dimensional structure defining at least three noncolinear lines.

12. The system of claim 11 wherein said three noncolinear lines are defined by three edges of said three-dimensional structure.

13. The system of claim 1 wherein said reference target comprises a tetrahedron framework.

14. The system of claim 1 wherein said reference target comprises a tetrahedron framework having at least three noncolinear light emitters disposed thereon.

15. The system of claim 1 wherein said reference indicia comprise a plurality of light sources and means for separately illuminating said light sources.

16. The system of claim 1 wherein said reference target includes a plurality of light sources and means for separately illuminating said sources.

17. The system of claim 1 wherein said reference target is a portable reference target.

18. The system of claim 1 further comprising:
a gauging station for gauging a workpiece, said feature sensor being securedly connected to said gauging station for determining positions upon said workpiece.

19. The system of claim 18 wherein said workpiece is a vehicle workpiece.

20. The system of claim 1 wherein said system operates within a vehicle manufacturing system.

21. A sensor calibration system for calibrating a feature sensor to a reference coordinate system, the feature sensor of the type employing structured light to detect the position and orientation of an object placed within the sensing zone of the feature sensor, comprising:
a structured light target for placement within the sensing zone of the feature sensor;
a plurality of energy emitters disposed in spaced apart locations on said target and defining a predetermined spatial relationship between emitters and target;
a controller for individually activating said emitters in a temporal sequence whereby one emitter is distinguished from the others;
a calibration sensor array for sensing the emitters and interpreting said temporal sequence to fix a reference coordinate system that relates the position and orientation of the target to the sensor array based on the predetermined spatial relationship between emitters and target; and
calibration system coupled to said sensor array and to said feature sensor for interpreting structured light reflected from said target to fix a feature sensor coordinate system and for mapping the feature sensor coordinate system to said reference coordinate system, whereby the feature sensor is calibrated to said reference coordinate system.

22. The calibration system of claim 21 wherein said energy emitters are optical energy emitters.

23. The calibration system of claim 21 wherein said energy emitters are sonic energy emitters.

24. The calibration system of claim 21 wherein said target is a framework having at least three noncolinear light reflecting structures.

25. The calibration system of claim 21 wherein said target comprises a tetrahedron structure.

26. The calibration system of claim 21 wherein said target comprises a tetrahedron structure and said emitters are disposed at vertices of said tetrahedron structure.

27. The calibration system of claim 21 wherein said calibration sensor array comprises a plurality of charge coupled devices (CCD) having different linear polarizations.

28. The calibration system of claim 21 wherein said calibration sensor array comprises a plurality of linear array charge coupled devices (CCD).

29. A sensor calibration system to assist an operator in positioning a feature sensor relative to a reference coordinate system, comprising:
a first memory structure for storing the desired position of the feature sensor in six degrees of freedom;
a second memory structure for storing the current position of the feature sensor in six degrees of freedom;
a sensor calibration system coupled to the feature sensor for measuring the actual position of the feature sensor relative to said reference coordinate system, said calibration system being coupled to said second memory structure for supplying data indicative of the current position of the feature sensor in six degrees of freedom;
a virtual image generation system coupled to said first and second memory structures for generating a first virtual image representing the desired position of the sensor and for generating a second virtual image representing the current position of the sensor;
graphical display engine coupled to said virtual image generation system for simultaneously displaying said first and second virtual images on a display, whereby the operator viewing the display receives real time visual feedback with which to compare the desired and current positions of the sensor as it is being adjusted into position.

30. The sensor calibration system of claim 29 wherein said sensor calibration system comprises:
a structured light target for placement within the sensing zone of the feature sensor;
a plurality of energy emitters disposed in spaced apart locations on said target and defining a predetermined spatial relationship between emitters and target;
a controller for individually activating said emitters in a temporal sequence whereby one emitter is distinguished from the others;
a calibration sensor array for sensing the emitters and interpreting said temporal sequence to fix a reference coordinate system that relates the position and orientation of the target to the sensor array based on the predetermined spatial relationship between emitters and target; and
calibration system coupled to said sensor array and to said feature sensor for interpreting structured light reflected from said target to fix a feature sensor coordinate system and for mapping the feature sensor coordinate system to said reference coordinate system, whereby the feature sensor is calibrated to said reference coordinate system.

31. The sensor calibration system of claim 29 wherein said first virtual image is a nonbilaterally symmetrical virtual image representing the desired position of the sensor.

32. The sensor calibration system of claim 29 wherein said second virtual image is a nonbilaterally symmetrical virtual image representing the current position of the sensor.

33. The sensor calibration system of claim 29 wherein said first virtual image is a nonbilaterally symmetrical virtual image representing the desired position of the sensor, and wherein said second virtual image is a nonbilaterally symmetrical virtual image representing the current position of the sensor.

* * * * *